US012699667B2

(12) United States Patent (10) Patent No.: US 12,699,667 B2
Busono et al. (45) Date of Patent: Aug. 4, 2026

(54) SYSTEMS AND METHODS OF CONTROLLING COMMUNICATION MODES IN AN ELECTRONIC DEVICE

(71) Applicant: Microsoft Technology Licensing, LLC, Redmond, WA (US)

(72) Inventors: Julia Jacinta Busono, Woodinville, WA (US); Robert Glenn Rundell, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/914,674

(22) Filed: Oct. 14, 2024

(65) Prior Publication Data

US 2025/0110905 A1 Apr. 3, 2025

Related U.S. Application Data

(63) Continuation of application No. 18/008,084, filed as application No. PCT/US2021/035893 on Jun. 4, 2021, now Pat. No. 12,117,950.

(30) Foreign Application Priority Data

Jun. 4, 2020 (NL) ...................................... 2025755

(51) Int. Cl.
*G06F 13/38* (2006.01)
(52) U.S. Cl.
CPC ................................. *G06F 13/385* (2013.01)
(58) Field of Classification Search
CPC .................................................... G06F 13/385
See application file for complete search history.

(56) References Cited

U.S. PATENT DOCUMENTS

| | | | | | |
|---|---|---|---|---|---|
| 2013/0275629 A1* | 10/2013 | Hall | ...................... | G06F 13/385 | |
| | | | | | 710/14 |
| 2014/0003451 A1* | 1/2014 | Wagh | .................. | G06F 13/4027 | |
| | | | | | 370/468 |
| 2016/0127671 A1* | 5/2016 | Hundal | ................ | C08G 59/687 | |
| | | | | | 348/723 |
| 2021/0224216 A1* | 7/2021 | Huang | ................ | G06F 13/4282 | |

OTHER PUBLICATIONS

Communication pursuant to Article 94(3) EPC, Received for European Application No. 21734262.5, mailed on Sep. 15, 2025, 9 pages.
First Examination Report Received for Indian Application No. 202247067431, mailed on Jul. 3, 2025, 06 pages.

* cited by examiner

*Primary Examiner* — Henry Tsai
*Assistant Examiner* — Aurangzeb Hassan
(74) *Attorney, Agent, or Firm* — Ray Quinney & Nebeker P.C.; Paul N. Taylor

(57) ABSTRACT

A method of providing data communication between a first device and a second device includes, establishing a first communication link with a downstream device connected to the second device using a first mode via a USB-type interface, wherein in the first mode the USB-type interface utilizes a first set of USB communication lanes; establishing a second communication link with the first device via the USB-C port using an Alternate mode wherein the Alt-mode utilizes the first set of USB communication lanes; and, in accordance with establishing the second communication link, changing a mode of the first communication link so that the first communication link does not communicate via the first set of USB communication lanes.

20 Claims, 3 Drawing Sheets

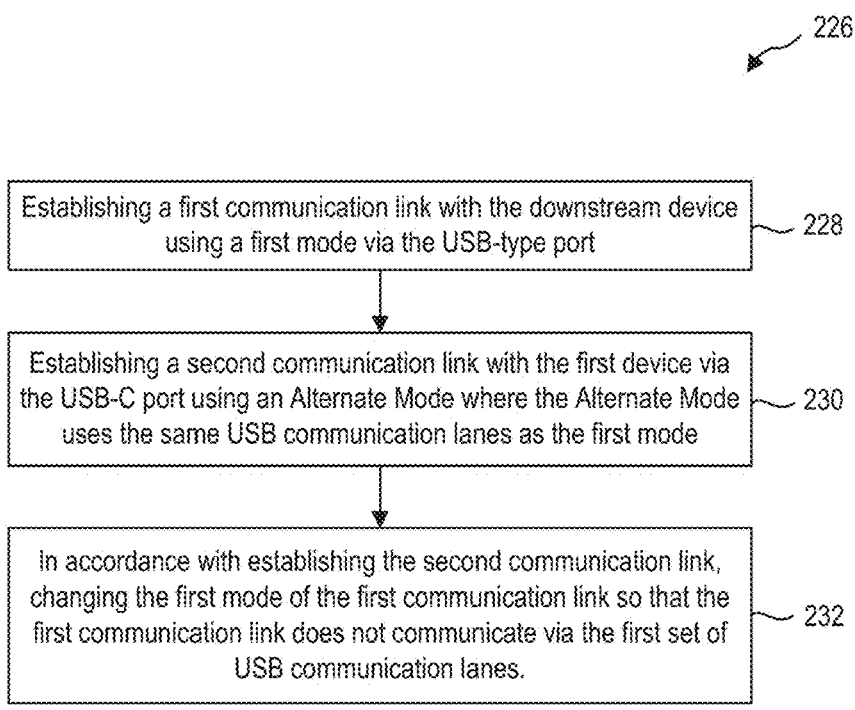

226

Establishing a first communication link with the downstream device using a first mode via the USB-type port — 228

Establishing a second communication link with the first device via the USB-C port using an Alternate Mode where the Alternate Mode uses the same USB communication lanes as the first mode — 230

In accordance with establishing the second communication link, changing the first mode of the first communication link so that the first communication link does not communicate via the first set of USB communication lanes. — 232

FIG. 3

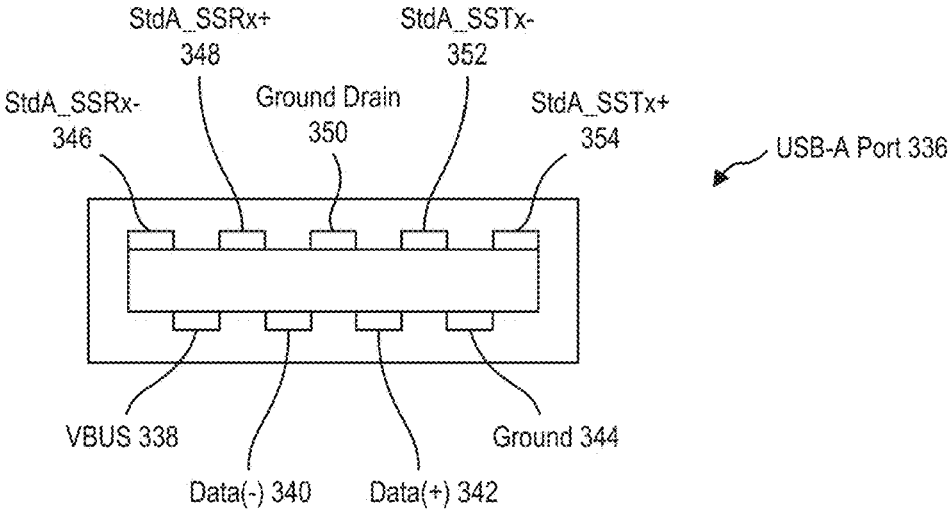

StdA_SSRx+ 348     StdA_SSTx- 352

StdA_SSRx- 346     Ground Drain 350     StdA_SSTx+ 354

USB-A Port 336

VBUS 338     Ground 344

Data(-) 340     Data(+) 342

FIG. 4

SYSTEMS AND METHODS OF CONTROLLING COMMUNICATION MODES IN AN ELECTRONIC DEVICE

CROSS REFERENCE TO RELATED APPLICATIONS

This application is a continuation of U.S. patent application Ser. No. 18/008,084, filed Dec. 2, 2022, which is a United States National Phase Entry of Patent Cooperation Treaty Application No. PCT/US2021/035893, filed on Jun. 4, 2021, which claims priority to and the benefit of Netherlands Application No. 2025755, filed Jun. 4, 2020, which are hereby incorporated by reference in their entireties.

BACKGROUND

Background and Relevant Art

A computing device includes one or more connection ports to allow the connection of cables or wires between the computing device and a power supply, input devices, video displays, storage devices, audio output components, other peripheral devices, and other external resources, such as network communications. The connection ports are conventionally backward compatible to use legacy communication modes when newer communication modes are not available. The availability of the data lanes limits the availability of some communication modes.

BRIEF SUMMARY

In some embodiments, a method of providing data communication between a first device and a second device includes, at a second device, wherein the second device has a USB component that includes a USB-C port and one or more additional USB-type interfaces: establishing a first communication link with the downstream device using a first mode via the USB-type interface, wherein in the first mode the USB-type interface utilizes a first set of USB communication lanes; establishing a second communication link with the first device via the USB-C port using an Alternate mode wherein the Alt-mode utilizes the first set of USB communication lanes, and; in accordance with establishing the second communication link changing a mode of the first communication link so that the first communication link does not communicate via the first set of USB communication lanes.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 3 is a flowchart illustrating a method of providing data communication between a host device and a downstream device, according to at least one embodiment of the present disclosure; and FIG. 4 is a front view of a USB-type interface, according to at least one embodiment of the present disclosure.

DETAILED DESCRIPTION

Figure 1:
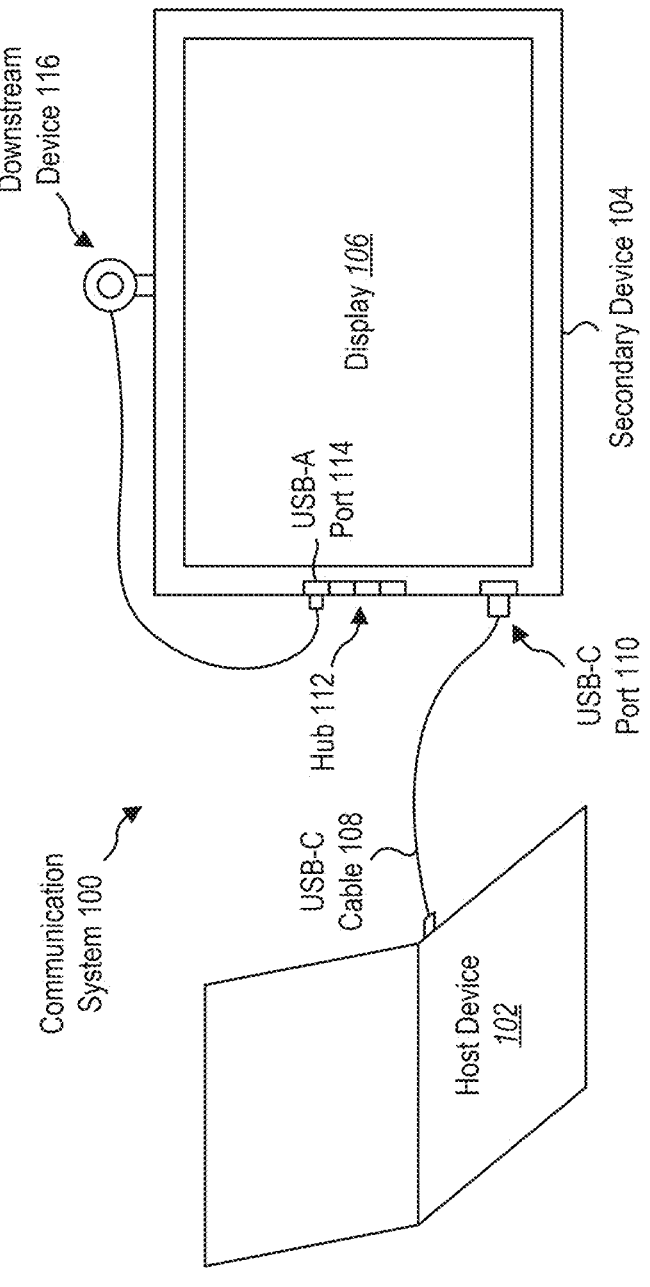
FIG. 1 is a system diagram of a communication system, according to at least one embodiment of the present disclosure.

The present disclosure relates generally to systems and methods for improving reliability and functionality of connection ports in an electronic device. More particularly, electronic devices that utilize universal serial bus (USB) type connections with shared data lanes between the connections can experience limitations in communications when a communication mode of one of the connections utilizes all available data lanes of a single type. In some embodiments, USB connections that use a first set of data lanes can lose communications or otherwise lose functionality when another connection is negotiated for another port that uses all of the data lanes of the first set of data lanes. In some embodiments, USB connections that use a first set of data lanes (e.g., differential data lanes) can be orphaned when a DisplayPort (DP) connection is negotiated for another connection that uses all of the data lanes of the first set of data lanes (e.g., the same differential data lanes). In some embodiments, USB connections that use a first set of data lanes can be orphaned when a Thunderbolt connection is negotiated for another port that uses all of the data lanes of the first set of data lanes. Because an alternate communication mode (Alt-Mode) can monopolize all associated data lanes, those data lanes are unavailable for communication with other connections. In some embodiments, once the data lanes are allocated to the Alt-mode connection, the electronic device has no communication path to the other downstream devices. In some embodiments, an Alt-mode includes a DP connection, a High Definition Media Interface (HDMI) connection, a Thunderbolt connection, a Mobile High-definition Link (MHL) connection, or a PCI Express connection.

In some embodiments, a device has a USB component that includes a USB-C port and one or more additional USB-type interfaces. In some embodiments, the USB-type interface is an external facing connection that receives a USB-A, USB-B, USB-C or other USB format connector. In some embodiments, the USB-type interface is an internal connection that may or may not be hardwired to the electronic component(s) of the device.

In some embodiments, a USB-C port has differential data lanes that are common to at least one other USB-type interface for a communication mode. For example, a USB-C port and a USB3 port each have USB3 format differential data lanes (i.e., pairs of wires) and use the USB3 data lanes for communication between devices connected to the ports. In some embodiments, the USB-C port and the USB-type interface share data lanes for DP data communication and for USB v data communication. In some embodiments, the USB-C port and the USB-type interface share data lanes for Thunderbolt and for USB 3.x data communication. In some embodiments, the USB-C port and the USB-type interface share data lanes for DisplayPort and for Thunderbolt data communication. When a USB-C port allocates all USB3 data lanes to a DisplayPort Alt-mode, no USB3 data lanes are available to communicate with those of the USB-type interface in the device and communication with a downstream device communicating via a USB3 communication link can be lost.

In some embodiments, the USB-C port and the USB-type interface share four data lanes (e.g., the USB-type interface is also a USB-C port, and each has four USB 3 differential data lanes). In some embodiments, the USB-C port and the USB-type interface share less than four data lanes (e.g., the USB-type interface is a USB-A 3.x port and has two USB 3 differential data lanes). In some embodiments, the Alt-mode of the USB-C port uses all of the shared data lanes (e.g., the Alt-mode of the USB-C port uses all four USB3 differential data lanes of the USB-C port). In some embodiments, the Alt-mode of the USB-C port uses four of the shared data lanes.

In some embodiments, a communication system for transmitting data includes a first device and a second device connected through a USB connection, with a downstream device also communicating with the second device through a USB connection. In some embodiments, the first device is a host device and the second device is a secondary device used to record, store, receive, present, display, or play the transmitted data. In some embodiments, the secondary device includes a display or other component for presenting the data received from the host device. For example, the host device may transmit video data to the secondary device to be displayed on a display of the secondary device. In some embodiments, the secondary device includes a speaker or other component for playing the data received from the host device. In some embodiments, the secondary device includes a memory module or other storage device for storing the data received from the host device.

In some embodiments, the host device is connected to the secondary device via a wired connection. In some embodiments, the wired connection is a selectively connectable cable. In some embodiments, the wired connection is a USB-C format cable. In some embodiments, the wired connection is a connected to the host device with a non-USB-C format connection, such as a DisplayPort format connection or a USB format connection that is not a USB-C format connection, and the cable connects to the secondary device with a USB-C format connection.

In some embodiments, the downstream device is connected to the secondary device via a wired connection. In some embodiments, the wired connection is a selectively connectable cable. In some embodiments, the wired connection is a USB-C format cable. In some embodiments, the wired connection is a USB-A format cable. In some embodiments, the wired connection is a USB-B format cable. In some embodiments, the wired connection is another USB format.

FIG. 1 illustrates an embodiment of a communication system 100 between a host device 102 and a secondary device 104. In some embodiments, the secondary device 104 includes a display 106 that may present video data sent from the host device 102 to the secondary device 104 via a USB-C connection. In some embodiments, the USB-C connection is a wired connection, such as the USB-C cable 108, illustrated in FIG. 1, plugged into the USB-C port 110 of the secondary device 104.

In some embodiments, the host device is connected to the secondary device via a wireless connection. In some embodiments, the wireless connection includes at least one selectively connectable transceiver. In some embodiments, a first wireless transceiver is selectively connected to the host device and a second wireless transceiver is selectively connected to the secondary device to facilitate data communication therebetween. In some embodiments, the host device includes an integral transceiver and communicates wirelessly with a wireless transceiver selectively connected to the secondary device.

In some embodiments, the secondary device has a USB-C port to receive the cable or transceiver. In some embodiments, the USB-C port is a standalone port in the secondary device. In some embodiments, the USB-C port is part of a USB hub. In some embodiments, the secondary device includes a USB hub including a plurality of USB-type interfaces that is separate from the USB-C port. In some embodiments, the USB-C port and at least one USB-type interface of the secondary device share a first set of data lanes via a multiplexer, as will be described in more detail. For example, the USB-C port and the USB hub of the secondary device may share data lanes via a multiplexer.

In some embodiments, a downstream device is connected to the USB-type interface of the secondary device. In some embodiments, the downstream device is selectively connected via a wired connection to the USB-type interface. In some embodiments, the downstream device is selectively connected via a hardwired connection to the USB-type interface. In some embodiments, the downstream device is connected via a wireless transceiver selectively connected to the USB-type interface. In some embodiments, the downstream device is connected via a wireless transceiver hardwired to the USB-type interface. In some embodiments, the downstream device is a camera or other video capture device. In some embodiments, the downstream device is a microphone or other audio capture device. In some embodiments, the downstream device is a keyboard or other input device. In some embodiments, the downstream device is a solid-state drive or other storage device.

Referring again to FIG. 1, the secondary device 104 includes a hub 112 with a plurality of USB ports 114. In some embodiments, the communication system 100 includes a downstream device 116 that is a video camera connected to one of the USB ports 114 of the hub 112 to provide data communication with the secondary device 104, such as for video conferencing using the display 106.

In some embodiments, where the downstream device is communicating with an electronic component of the secondary device or other downstream device using a USB 3.x communication mode, the downstream device uses the first set of data lanes. When the first set of data lanes is shared with the USB-C port and, hence, communication between the downstream device and the host device, the USB-C port and the USB-type interface connected to the downstream device both use the first set of data lanes. When the data connection from the host device to the secondary device via the USB-C port requires the use of all of the data lanes of the first set and/or there are insufficient remaining data lanes in the first set for the downstream device connected to the USB-type interface to continue communicating with the host device via a USB 3.x communication mode, the downstream device and/or the USB-type interface can change to a USB 2.x communication mode that uses a second set of data lanes or other communication mode that uses other data communication hardware. In at least one embodiment, the host device and the secondary device establish a four-lane DP Alt-mode therebetween, allocating all of the first set of data lanes of the USB-C port in the secondary device. The secondary device sends a signal or command to change the communication mode of the downstream device and/or the USB-type interface to a communication mode that uses a second set of data lanes.

Figure 2:
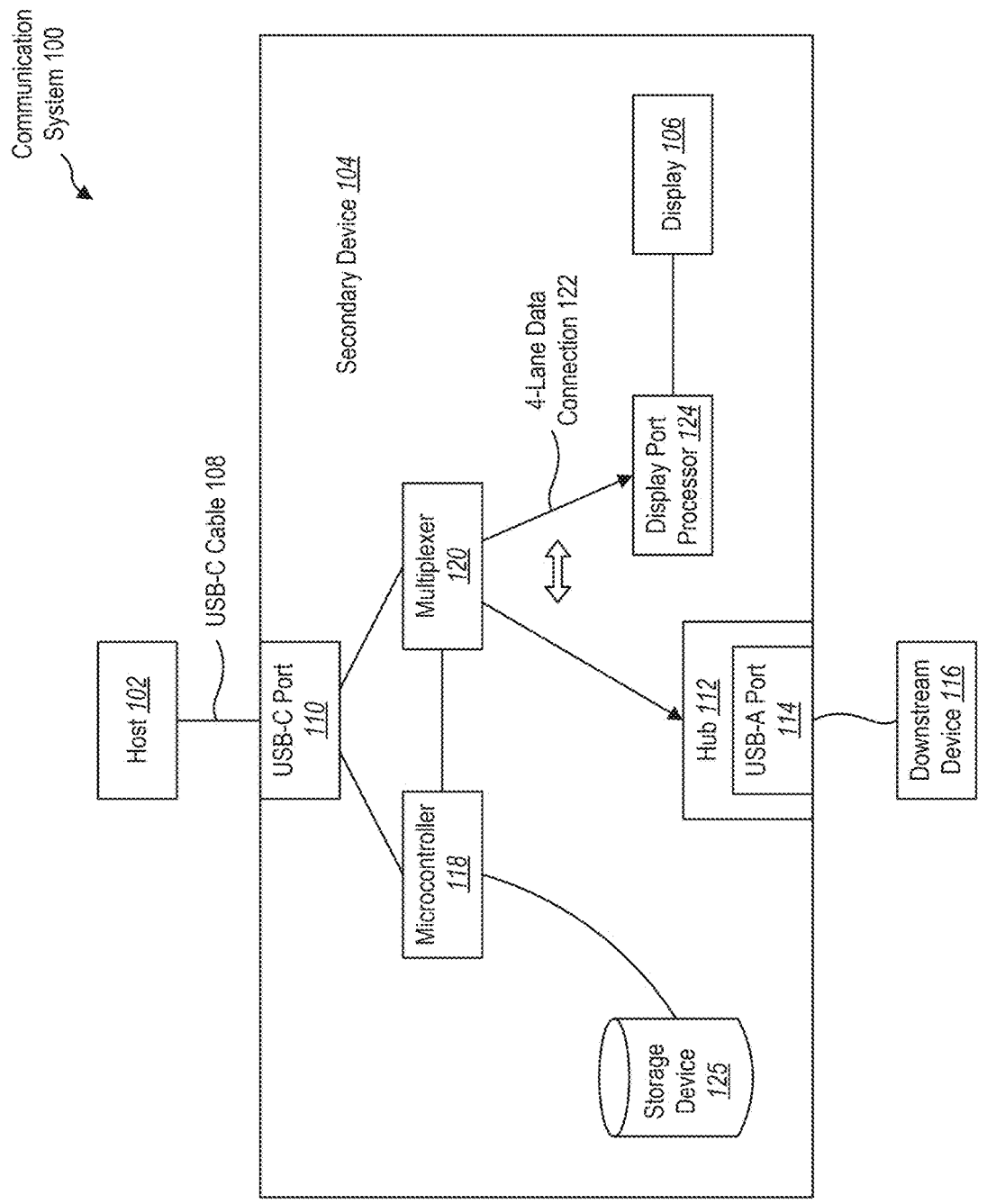
FIG. 2 is a schematic diagram of the communication system of FIG. 1, according to at least one embodiment of the present disclosure.

In some embodiments, a secondary device connected to a host device includes a microcontroller and a multiplexer (MUX). FIG. 2 is a schematic system diagram of the components of the secondary device 104 of FIG. 1 that facilitate data communication with upstream devices (e.g., the host device 102) and downstream devices (e.g., downstream device 116, the video camera of FIG. 1). The microcontroller 118 communicates with the USB-C port 110 to determine what type of host device 102 is connected to the USB-C port 110 and determine the capabilities of the host device 102. In some embodiments, the microcontroller 118 is a power deliver controller that determines the power and bandwidth requirements of both upstream and downstream devices connected to the secondary device 104.

The microcontroller 118 is further in communication with the MUX 120. The MUX 120 allows the first set of data lanes 122 to be allocated amongst the available ports and/or connections that use the first set of data lanes 122. In some embodiments, the MUX 120 can allocate lanes 122 individually to one or more ports 114. In some embodiments, the MUX 120 can allocate lanes 122 two at a time to one or more ports 114. In some embodiments, the MUX 120 can allocate lanes 122 four at a time to one or more ports 114. In some embodiments, the MUX 120 allocates all available lanes 122 of the first set to a single port 114. For example, additional data lanes allow increased bandwidth for the port, and some communication modes (such as Thunderbolt 3) can only achieve a maximum speed with all data lanes allocated to the port.

While the embodiments and examples described herein refer to shared data lanes between USB 3.x communication modes and DP or Thunderbolt communication modes, it should be understood that the systems and methods described herein may be relevant to any USB-type interfaces that share data lanes between ports and have multiple sets of data lanes.

In some embodiments, a downstream device 116 will experience an interruption in communications with the host device 102 and/or be orphaned by the MUX 120 allocating data lanes to a four-lane DP Alt-mode or Thunderbolt 3 Alt-mode when the downstream device 116 is using a USB 3.x communication mode on shared data lanes 122. In some embodiments, a first downstream device connected to the USB hub is communicating with the host device 102 using a USB 3.x communication mode, and a second downstream device connected to the USB hub is communicating with the host device 102 using a USB 2.x communication mode. USB 2.x uses a second set of data lanes that is distinct from those used for USB 3.x communication modes, DisplayPort Alt-modes, and Thunderbolt 3 Alt-modes. Therefore, the MUX allocating the first set of data lanes of the USB-C port for four-lane DP Alt-mode does not interfere with the communications of the second downstream device using a USB 2.x over the second set of data lanes. In some embodiments, the first downstream device using the USB 3.x communication mode over the first set of data lanes experiences an interruption unless the communication mode is changed.

In some embodiments, the microcontroller or other processor of the secondary device changes the communication mode of the first downstream device to another communication mode that does not use the first set of data lanes (e.g., to a USB 2.x communication mode) before the MUX allocates the first set of data lanes of the USB-C port. In some embodiments, the change in communication mode interrupts the communication of the first downstream device, but it ensures communication is maintained and the first downstream device is not orphaned. In some embodiments, the second downstream device is unaffected by the allocation of the first set of data lanes by the MUX.

In some embodiments, the microcontroller or other processor of the secondary device determines what devices are connected to the USB-type interface of the secondary device. In some embodiments, the downstream device is a downstream USB hub having a plurality of USB-type interfaces. In some embodiments, the secondary device detects one or more second downstream devices connected to the downstream USB hub. In some embodiments, the secondary device can change the communication mode of at least one second downstream devices and/or the downstream hub to a communication mode that does not use the first set of data lanes.

Referring again to FIG. 2, the secondary device 104 may allocate data lanes 122 based upon the determined capabilities of the host device 102 connected to the USB-C port 110. In some embodiments, the microcontroller 118 is in communication with the MUX 120 to selectively allocate data lanes 122 of the USB-C port 110 between the USB hub 112 and/or the USB-type interface(s) 114 and a DP processor 124. The DP processor 124 can receive video information through the data lanes 122 and present the video information on the display 106 of the secondary device 104. In some embodiments, the MUX 120 selectively allocates data lanes 122 between the USB hub 112 and/or the USB-type interface(s) 114 and other components and/or processors depending on the determined capabilities, data type, available Alt-modes, or combinations thereof of the host device 102 and the USB-C port 110 connection.

In some embodiments, the microcontroller instructs the MUX to allocate all four data lanes to the DP processor in a four-lane DP Alt-mode to display the video information from the host device. In some embodiments, the microcontroller instructs the MUX to allocate all four data lanes to another component of the secondary device in a four-lane Thunderbolt 3 Alt-mode to process the data from the host device at the maximum bandwidth of Thunderbolt 3.

In some embodiments, the microcontroller 118 is electrically connected to and in data communication with a storage device 125. In some embodiments, the storage device 125 has instructions stored thereon that cause the secondary device 104 to perform any of the embodiments of methods described herein.

FIG. 3 is a flowchart that illustrates an embodiment of a method 226 of providing data communication between a first device and a downstream device. In some embodiments, a method 226 of providing data communication between a first device and a second device includes preventing and/or limiting the interruption of data communication of downstream devices or nodes. In some embodiments, preventing and/or limiting the interruption of data communication of downstream nodes includes determining a communication mode of the downstream node(s) and changing a communication mode of a downstream node. In some embodiments, preventing and/or limiting the interruption of data communication of downstream nodes includes determining a communication mode of the downstream node(s) and changing a communication mode of a first downstream node and not changing a communication mode of a second downstream node.

A method 226 of providing data communication between a first device and a downstream device, in some embodiments, includes establishing (228) a first communication link with the downstream device and establishing (230) a second communication link with the first device. The communication links are each with a secondary device with USB connections. In some embodiments, the first communication link is via a USB-type interface, and the second communication link is via a USB-C port. The first device and downstream device may communicate with one another via the USB connections of the secondary device. In some embodiments, the first communication link transmits and receives data over a first set of USB communication lanes of the USB-type interface via a first communication mode. In some embodiments, the second communication link transmits and receives data over the same USB communication lanes of the USB-C port. In some embodiments, the first communication mode and the Alt-mode both use the USB3 communication lanes. In some embodiments, the first communication mode is a USB 3.1 data communication mode. In some embodiments, the first communication mode is a USB 2.1 data communication mode. In some embodiments, the first communication mode is a Thunderbolt data communication mode or other Alt-mode.

In some embodiments, a downstream node is a USB-type interface, such as a USB-A port, a USB-B port, a mini-USB port, or a micro-USB port. In some embodiments, a downstream node is a downstream device connected to the USB-type interface. In at least one embodiment, a downstream device connected to the USB-type interface is communicating via a USB 3.2 communication mode on the first set of USB communication lanes and the USB-C port Alt-mode communicates on the first set of USB communication lanes.

In some embodiments, establishing the second communication link via the USB-C port using an Alt-mode includes switching the USB-C port to an Alt-mode that uses the first set of USB communication lanes or data lanes. In some embodiments, the Alt-mode uses all of the first set of USB data lanes of the USB-C port, such as four-lane DP Alt-mode, four-lane Thunderbolt Alt-mode, four-lane HDMI Alt-mode, a four-lane MHL Alt-mode, a four-lane PCI Express Alt-mode, or other Alt-modes. Establishing the second communication link via the USB-C port to an Alt-mode, in some embodiments, includes determining communication capabilities and/or requirements of the first device. In some embodiments, a microcontroller of the second device communicates with a microcontroller of the first device to determine the capabilities and/or requirements of the first device and sets the communication mode of the USB-C port to an Alt-mode based at least partially upon the communication with the first device. In some embodiments, a power delivery controller of the second device communicates with a power delivery controller of the first device to determine the capabilities and/or requirements of the first device and sets the communication mode of the USB-C port to an Alt-mode based at least partially upon the communication with the first device.

In some embodiments, the method further includes changing (232) the first communication mode of the first communication link whether one or more nodes downstream of the USB-C port in the second device are communicating via the first set of USB communication lanes.

In some embodiments, a downstream device or node is communicating via a second set of USB communication lanes and can continue to use the second set of USB communication lanes without interruption due to the switching of the first set of USB communication lanes. Therefore, the method, in some embodiments, includes sending no signal to and/or not changing a communication of a downstream node not communicating via the first set of USB communication lanes. In some embodiments, the downstream node is communicating via a USB 2.x or USB 1.x communication mode uses data lanes that are independent of those used by USB 3.x, DP, or Thunderbolt 3 Alt-modes.

When a downstream device or node is communicating via the first set of USB communication lanes, the method includes, in some embodiments, changing (234) the mode of the downstream node so that the node does not communicate via the first set of USB communication lanes. In a conventional system, allowing the downstream node to remain attempting to use the first set of USB communication lanes after switching the USB-C port to an Alt-mode that uses all of the first set of USB communication lanes can orphan the downstream node and cause a loss of communication with the downstream node. In some embodiments, the mode of the downstream device or node is changed so that the node does not communicate via the first set of USB communication lanes before setting the USB-C port to the Alt-mode. In some embodiments, the mode of the downstream device or node is changed so that the node does not communicate via the first set of USB communication lanes simultaneously with setting the USB-C port to the Alt-mode.

In some embodiments, changing the mode of the downstream device or node includes sending a signal to a downstream device to negotiate the change in communication modes. In some embodiments, changing the mode of the downstream node includes cycling the power on a USB-type interface to force a new negotiation of the communication mode between the downstream device with the secondary device. In some embodiments, the signal to the downstream mode includes providing a signal to toggle the VBUS_EN of the USB-type interface. In some embodiments, changing the mode includes sending the signal to toggle the VBUS_EN for at least 200 ms. In some embodiments, changing the mode includes de-asserting a VBUS_EN signal for at least 200 ms and reasserting the VBUS_EN signal after. In some embodiments, changing the communication mode of the first communication link includes changing the mode to a slower data connection. For example, the USB3.2 2×2 communication mode can transfer data at up to 20 Gbit/s, while USB 2.0 High Speed can transfer data at up to 480 Mbit/s.

In some embodiments with a selectively connectable port such as shown in FIG. 4, a USB3-A port 336 includes at least a VBUS pin 338, a Data(−) pin 340, a Data(+) pin 342, and a ground pin 344, as well as a SuperSpeed wire connections including StdA_SSRx− 346, StdA_SSRx+ 348, Ground Drain 350, StdA_SSTx− 352, and StdA_SSTx+ 354 wires. The signal to cycle the power of the USB-type interface and/or the signal to the downstream device to renegotiate a communication mode with the USB-type interface can be sent over the VBUS pin 338 (e.g., the power pin). In some embodiments, the signal to the downstream device to renegotiate a communication mode with the USB-type interface can be sent over the Data pin(s) 340, 342. In some embodiments, the mode of the downstream node is changed by cycling the power to a root hub of the USB-type interface, which, in turn, forces a negotiation of a communication mode between the downstream device and the USB-type interface.

INDUSTRIAL APPLICABILITY

The present disclosure relates generally to systems and methods for improving reliability and functionality of connection ports in an electronic device. More particularly, electronic devices that utilize universal serial bus (USB) type connections with shared data lanes can experience limitations in communications when communication modes utilize all available data lanes of a single type. In some embodiments, USB connections that use a first set of data lanes can lose communications or otherwise lose functionality when another connection is negotiated that uses all of the data lanes of the first set of data lanes. In some embodiments, USB connections that use a first set of data lanes (e.g., USB3 differential data lanes) can be orphaned when a DisplayPort connection is negotiated that uses all of the data lanes of the first set of data lanes (e.g., the same USB3 differential data lanes). In some embodiments, USB connections that use a first set of data lanes can be orphaned when a Thunderbolt connection is negotiated that uses all of the data lanes of the first set of data lanes. Because an alternate communication mode (Alt-Mode) can monopolize all associated data lanes, those data lanes are unavailable for communication with other connections. In some embodiments, once the data lanes are allocated to the Alt-mode connection, the electronic device has no communication path to the other downstream devices.

In some embodiments, a device has a USB component that includes a USB-C port and one or more additional USB-type interfaces. In some embodiments, the USB-type interface is an external facing connection that receives a USB-A, USB-B, USB-C or other USB format connector. In some embodiments, the USB-type interface is an internal connection that may or may not be hardwired to the electronic component(s) of the device.

In some embodiments, a USB-C port has differential data lanes that are common to at least one other USB-type interface for a communication mode. For example, a USB-C port and a USB3 port each have four USB3 format differential data lanes (i.e., pairs of wires) and use the USB3 data lanes for communication between devices connected to the ports. In some embodiments, the USB-C port and the USB-type interface share data lanes for DisplayPort and for USB 3.x data communication. In some embodiments, the USB-C port and the USB-type interface share data lanes for Thunderbolt and for USB 3.x data communication. In some embodiments, the USB-C port and the USB-type interface share data lanes for DisplayPort and for Thunderbolt data communication. When a USB-C port allocates all USB3 data lanes to a DisplayPort Alt-mode, no USB3 data lanes are available to communicate with those of the USB-type interface in the device and communication with a downstream device communicating via a USB3 communication link can be lost.

In some embodiments, the USB-C port and the USB-type interface share four data lanes (e.g., the USB-type interface is also a USB-C port, and each has four USB 3 differential data lanes). In some embodiments, the USB-C port and the USB-type interface share less than four data lanes (e.g., the USB-type interface is a USB-A 3.x port and has two USB 3 differential data lanes). In some embodiments, the Alt-mode of the USB-C port uses all of the shared data lanes (e.g., the Alt-mode of the USB-C port uses all four USB3 differential data lanes of the USB-C port). In some embodiments, the Alt-mode of the USB-C port uses four of the shared data lanes.

In some embodiments, a communication system for transmitting data includes a first device and a second device connected through a USB connection, with a downstream device also communicating with the second device through a USB connection. In some embodiments, the first device is a host device and the second device is a secondary device used to record, store, receive, present, display, or play the transmitted data. In some embodiments, the secondary device includes a display or other component for presenting the data received from the host device. For example, the host device may transmit video data to the secondary device to be displayed on a display of the secondary device. In some embodiments, the secondary device includes a speaker or other component for playing the data received from the host device. In some embodiments, the secondary device includes a memory module or other storage device for storing the data received from the host device.

In some embodiments, the host device is connected to the secondary device via a wired connection. In some embodiments, the wired connection is a selectively connectable cable. In some embodiments, the wired connection is a USB-C format cable. In some embodiments, the wired connection is a connected to the host device with a non-USB-C format connection, such as a DisplayPort format connection or a USB format connection that is not a USB-C format connection, and the cable connects to the secondary device with a USB-C format connection.

In some embodiments, the downstream device is connected to the secondary device via a wired connection. In some embodiments, the wired connection is a selectively connectable cable. In some embodiments, the wired connection is a USB-C format cable. In some embodiments, the wired connection is a USB-A format cable. In some embodiments, the wired connection is a USB-B format cable. In some embodiments, the wired connection is another USB format.

In some embodiments, the host device is connected to the secondary device via a wireless connection. In some embodiments, the wireless connection includes at least one selectively connectable transceiver. In some embodiments, a first wireless transceiver is selectively connected to the host device and a second wireless transceiver is selectively connected to the secondary device to facilitate data communication therebetween. In some embodiments, the host device includes an integral transceiver and communicates wirelessly with a wireless transceiver selectively connected to the secondary device.

In some embodiments, the secondary device has a USB-C port to receive the cable or transceiver. In some embodiments, the USB-C port is a standalone port in the secondary device. In some embodiments, the USB-C port is part of a USB hub. In some embodiments, the secondary device includes a USB hub including a plurality of USB-type interfaces that is separate from the USB-C port. In some embodiments, the USB-C port and at least one USB-type interface of the secondary device share a first set of data lanes via a multiplexer, as will be described in more detail. For example, the USB-C port and the USB hub of the secondary device may share data lanes via a multiplexer.

In some embodiments, a downstream device is connected to the USB-type interface of the secondary device. In some embodiments, the downstream device is selectively connected via a wired connection to the USB-type interface. In some embodiments, the downstream device is selectively connected via a hardwired connection to the USB-type interface. In some embodiments, the downstream device is connected via a wireless transceiver selectively connected to the USB-type interface. In some embodiments, the downstream device is connected via a wireless transceiver hardwired to the USB-type interface. In some embodiments, the downstream device is a camera or other video capture device. In some embodiments, the downstream device is a microphone or other audio capture device. In some embodiments, the downstream device is a keyboard or other input device. In some embodiments, the downstream device is a solid-state drive or other storage device.

In some embodiments, where the downstream device is communicating with an electronic component of the secondary device or other downstream device using a USB 3.x communication mode, the downstream device uses the first set of data lanes. When the first set of data lanes is shared with the USB-C port and, hence, the communication between the downstream device and the host device, the USB-C port and the USB-type interface connected to the downstream device both use the first set of data lanes. When the data connection from the host device to the secondary device via the USB-C port requires the use of all of the data lanes of the first set and/or there are insufficient remaining data lanes in the first set for the downstream device connected to the USB-type interface to continue communicating with the host device via a USB 3.x communication mode, the downstream device and/or the USB-type interface can change to a USB 2.x communication mode that uses a second set of data lanes or other data communication hardware. In at least one embodiment, the host device and the secondary device establish a four-lane DP Alt-mode therebetween, allocating all of the first set of data lanes of the USB-C port in the secondary device. The secondary device sends a signal or command to change the communication mode of the downstream device and/or the USB-type interface to a communication mode that uses a second set of data lanes.

In some embodiments, a secondary device connected to a host device includes a microcontroller and a multiplexer (MUX). The microcontroller communicates with the USB-C port to determine what type of host device is connected to the USB-C port and determine the capabilities of the host device. In some embodiments, the microcontroller is a power deliver controller that determines the power and bandwidth requirements of both upstream and downstream devices connected to the secondary device.

The microcontroller is further in communication with the MUX. The MUX allows the first set of data lanes to be allocated amongst the available ports and/or connections that use the first set of data lanes. In some embodiments, the MUX can allocate lanes individually to one or more ports. In some embodiments, the MUX can allocate lanes two at a time to one or more ports. In some embodiments, the MUX can allocate lanes four at a time to one or more ports. In some embodiments, the MUX allocates all available lanes of the first set to a single port. For example, additional data lanes allow increased bandwidth for the port, and some communication modes (such as Thunderbolt 3) can only achieve a maximum speed with all data lanes allocated to the port.

While the embodiments and examples described herein refer to shared data lanes between USB 3.x communication modes and DP or Thunderbolt communication modes, it should be understood that the systems and methods described herein may be relevant to any USB-type interfaces that share data lanes between ports and have multiple sets of data lanes.

In some embodiments, a downstream device will experience an interruption in communications with the host device and/or be orphaned by the MUX allocating data lanes to a four-lane DP Alt-mode or Thunderbolt 3 Alt-mode when the downstream device is using a USB 3.x communication mode on shared data lanes. In some embodiments, a first downstream device connected to the USB hub is communicating with the host device using a USB 3.x communication mode, and a second downstream device connected to the USB hub is communicating using a USB 2.x communication mode. USB 2.x uses a second set of data lanes that is distinct from those used for USB 3.x communication modes, DisplayPort Alt-modes, and Thunderbolt 3 Alt-modes. Therefore, the MUX allocating the first set of data lanes of the USB-C port for four-lane DP Alt-mode does not interfere with the communications of the second downstream device using a USB 2.x over the second set of data lanes. In some embodiments, the first downstream device using the USB 3.x communication mode over the first set of data lanes experiences an interruption unless the communication mode is changed.

In some embodiments, the microcontroller or other processor of the secondary device changes the communication mode of the first downstream device to another communication mode that does not use the first set of data lanes (e.g., to a USB 2.x communication mode) before the MUX allocates the first set of data lanes of the USB-C port. In some embodiments, the change in communication mode interrupts the communication of the first downstream device, but it ensures communication is maintained and the first downstream device is not orphaned. In some embodiments, the second downstream device is unaffected by the allocation of the first set of data lanes by the MUX.

In some embodiments, the microcontroller or other processor of the secondary device determines what devices are connected to the USB-type interface of the secondary device. In some embodiments, the downstream device is a downstream USB hub having a plurality of USB-type interfaces. In some embodiments, the secondary device detects one or more second downstream devices connected to the downstream USB hub. In some embodiments, the secondary device can change the communication mode of at least one second downstream devices and/or the downstream hub to a communication mode that does not use the first set of data lanes.

The secondary device may allocate data lanes port based upon the determined capabilities of the host device connected to the USB-C port. In some embodiments, the microcontroller is in communication with the MUX to selectively allocate data lanes of the USB-C port between the USB hub and/or the USB-type interface(s) and a DP processor. The DP Processor can receive video information through the data lanes and present the video information on the display of the secondary device. In some embodiments, the MUX selectively allocates data lanes between the USB hub and/or the USB-type interface(s) and other components and/or processors depending on the determined capabilities, data type, available Alt-modes, or combinations thereof of the host device and the USB-C port connection.

In some embodiments, the microcontroller instructs the MUX to allocate all four data lanes to the DP processor in a four-lane DP Alt-mode to display the video information from the host device. In some embodiments, the microcontroller instructs the MUX to allocate all four data lanes to another component of the secondary device in a four-lane Thunderbolt 3 Alt-mode to process the data from the host device at the maximum bandwidth of Thunderbolt 3.

In some embodiments, the microcontroller is electrically connected to and in data communication with a storage device. In some embodiments, the storage device has instructions stored thereon that cause the secondary device to perform any of the embodiments of methods described herein.

In some embodiments, a method of providing data communication between a first device and a downstream device includes preventing and/or limiting the interruption of data communication of downstream devices or nodes. In some embodiments, preventing and/or limiting the interruption of data communication of downstream nodes includes determining a communication mode of the downstream node(s) and changing a communication mode of a downstream node. In some embodiments, preventing and/or limiting the interruption of data communication of downstream nodes includes determining a communication mode of the downstream node(s) and changing a communication mode of a first downstream node and not changing a communication mode of a second downstream node.

A method of providing data communication between a first device and a downstream device, in some embodiments, includes establishing (228) a first communication link with the downstream device and establishing (230) a second communication link with the first device. The communication links are each with a secondary device with USB connections. In some embodiments, the first communication link is via a USB-type interface, and the second communication link is via a USB-C port. The first device and downstream device may communicate with one another via the USB connections of the secondary device. In some embodiments, the first communication link transmits and receives data over a first set of USB communication lanes of the USB-type interface via a first communication mode. In some embodiments, the second communication link transmits and receives data over the same USB communication lanes of the USB-C port. In some embodiments, the first communication mode and the Alt-mode both use the USB3 communication lanes. In some embodiments, the first communication mode is a USB 3.1 data communication mode. In some embodiments, the first communication mode is a USB 2.1 data communication mode. In some embodiments, the first communication mode is a Thunderbolt data communication mode or other Alt-mode.

In some embodiments, a downstream node is a USB-type interface, such as a USB-A port, a USB-B port, a mini-USB port, or a micro-USB port. In some embodiments, a downstream node is a downstream device connected to the USB-type interface. In at least one embodiment, a downstream device connected to the USB-type interface is communicating via a USB 3.2 communication mode on the first set of USB communication lanes and the USB-C port Alt-mode communicates on the first set of USB communication lanes.

In some embodiments, establishing the second communication link via the USB-C port using an Alt-mode includes switching the USB-C port to an Alt-mode that uses the first set of USB communication lanes or data lanes. In some embodiments, the Alt-mode uses all of the first set of USB data lanes of the USB-C port, such as four-lane DP Alt-mode, four-lane Thunderbolt Alt-mode, four-lane HDMI Alt-mode, a four-lane MHL Alt-mode, a four-lane PCI Express Alt-mode, or other Alt-modes. Establishing the second communication link via the USB-C port to an Alt-mode, in some embodiments, includes determining communication capabilities and/or requirements of the first device. In some embodiments, a microcontroller of the second device communicates with a microcontroller of the first device to determine the capabilities and/or requirements of the first device and sets the communication mode of the USB-C port to an Alt-mode based at least partially upon the communication with the first device. In some embodiments, a power delivery controller of the second device communicates with a power delivery controller of the first device to determine the capabilities and/or requirements of the first device and sets the communication mode of the USB-C port to an Alt-mode based at least partially upon the communication with the first device.

In some embodiments, the method further includes changing (232) the first communication mode of the first communication link whether one or more nodes downstream of the USB-C port in the second device are communicating via the first set of USB communication lanes.

In some embodiments, a downstream device or node is communicating via a second set of USB communication lanes and can continue to use the second set of USB communication lanes without interruption due to the switching of the first set of USB communication lanes. Therefore, the method, in some embodiments, includes sending no signal to and/or not changing a communication of a downstream node not communicating via the first set of USB communication lanes. In some embodiments, the downstream node is communicating via a USB 2.x or USB 1.x communication mode uses data lanes that are independent of those used by USB 3.x, DP, or Thunderbolt 3 Alt-modes.

When a downstream device or node is communicating via the first set of USB communication lanes, the method includes, in some embodiments, changing (234) the mode of the downstream node so that the node does not communicate via the first set of USB communication lanes. In a conventional system, allowing the downstream node to remain attempting to use the first set of USB communication lanes after switching the USB-C port to an Alt-mode that uses all of the first set of USB communication lanes can orphan the downstream node and cause a loss of communication with the downstream node. In some embodiments, the mode of the downstream device or node is changed so that the node does not communicate via the first set of USB communication lanes before setting the USB-C port to the Alt-mode. In some embodiments, the mode of the downstream device or node is changed so that the node does not communicate via the first set of USB communication lanes simultaneously with setting the USB-C port to the Alt-mode.

In some embodiments, changing the mode of the downstream device or node includes sending a signal to a downstream device to negotiate the change in communication modes. In some embodiments, changing the mode of the downstream node includes cycling the power on a USB-type interface to force a new negotiation of the communication mode between the downstream device with the secondary device. In some embodiments, the signal to the downstream mode includes providing a signal to toggle the VBUS_EN of the USB-type interface via the VBUS_EN pin of the USB-type interface. In some embodiments, changing the mode includes sending the signal to toggle the VBUS_EN for at least 200 ms. In some embodiments, changing the mode includes de-asserting a VBUS_EN signal for at least 200 ms and reasserting the VBUS_EN signal after. In some embodiments, changing the communication mode of the first communication link includes changing the mode to a slower data connection. For example, the USB3.2 2×2 communication mode can transfer data at up to 20 Gbit/s, while USB 2.0 High Speed can transfer data at up to 480 Mbit/s.

In some embodiments with a selectively connectable port such as shown in FIG. 4, a USB3-A port 336 includes at least a VBUS pin 338, a Data(−) pin 340, a Data(+) pin 342, and a ground pin 344, as well as a SuperSpeed wire connections including StdA_SSRx− 346, StdA_SSRx+ 348, Ground Drain 350, StdA_SSTx− 352, and StdA_SSTx+ 354 wires. The signal to cycle the power of the USB-type interface and/or the signal to the downstream device to renegotiate a communication mode with the USB-type interface can be sent over the VBUS pin 338 (e.g., the power pin). In some embodiments, the signal to the downstream device to renegotiate a communication mode with the USB-type interface can be sent over the Data pin(s) 340, 342. In some embodiments, the mode of the downstream node is changed by cycling the power to a root hub of the USB-type interface, which, in turn, forces a negotiation of a communication mode between the downstream device and the USB-type interface.

In at least some embodiments, according to the present disclosure, interruptions and/or loss of communications with a downstream node can be limited and/or prevented by proactively avoiding conflicts in data lane usage on USB-type interfaces. By determining what devices and/or nodes are sharing a first set of USB communication lanes, a device can negotiate and enter a full-speed Alt-mode without orphaning previously connected downstream devices.

The present disclosure relates to systems and methods for improving reliability and functionality of connection ports in an electronic device according to at least the examples provided in the sections below:

1. A method of providing data communication between a first device (e.g., host device 102) and a downstream device (e.g., downstream device 116), the method comprising:
   at a second device (e.g., secondary device 104), wherein the second device has a USB component that includes a USB-C port (110) and one or more additional USB-type interfaces (114):
   establishing (228) a first communication link with the downstream device using a first mode via the USB-type interface, wherein in the first mode the USB-type interface utilizes a first set of USB communication lanes (e.g., data communication lanes 122);
   establishing (230) a second communication link with the first device via the USB-C port using an Alternate mode (Alt-mode) wherein the Alt-mode utilizes the first set of USB communication lanes; and;
   in accordance with establishing the second communication link changing (232) a mode of the first communication link so that the first communication link does not communicate via the first set of USB communication lanes.

2. The method of section 1, wherein the Alt-mode communication is a DisplayPort (DP) communication.

3. The method of section 1, wherein the Alt-mode communication is a Thunderbolt 3 communication.

4. The method of section 1, wherein the Alt-mode communication is a HDMI communication mode.

5. The method of any preceding section further comprising allocating a four-lane data connection to the Alt-mode communication.

6. The method of any preceding section, wherein changing the mode of the node includes sending a signal to toggle a VBUS_EN (e.g., via VBUS pin 338) of the USB-type interface (e.g., USB-A port 336).

7. The method of any preceding section, wherein changing the mode of the first communication link includes cycling the power to the USB-type interface.

8. The method of any preceding section, wherein changing the mode of the first communication link includes changing the mode to a slower data connection.

9. The method of any preceding section, wherein the USB-type interface is part of a main USB hub and changing the mode of the first communication link includes not resetting the main USB hub.

10. The method of any preceding section, wherein the downstream device is a downstream USB hub.

11. The method of section 10 further comprising:
   determining whether a second node is connected to the downstream USB hub;
   determining whether the second node is communicating via the first set of USB communication lanes; and
   changing a second mode of the second node so that the second node does not communicate via the first set of USB communication lanes before changing the mode of the downstream USB hub so that the node does not communicate via the first set of USB communication lanes.

12. A secondary device (e.g., secondary device 104), comprising:
   a USB-C port (110);
   a universal serial bus (USB) hub (112) having a plurality of ports (114);
   a DP processor (124);
   a multiplexer (120) in electrical communication with the USB-C port, wherein the multiplexer is configured to switch a four-lane data connection (122) between the USB hub to the DP processor;
   a microcontroller (e.g., microcontroller 118) in data communication with the multiplexer
   a storage device (125) electrically coupled to the microcontroller having instructions stored thereon that instruct the microcontroller to perform the method of any preceding claim.

13. The secondary device of section 12 further comprising a display panel (106) electrically coupled to the DP processor.

14. The secondary device of section 12, wherein the microcontroller is further configured to determine whether the host device is capable of four-lane DisplayPort Alt-Mode.

15. A communication system comprising:
   a host device (102);
   the secondary device of any of sections 12-14; and
   a data cable (108) connecting the host device to the USB-C port of the secondary device.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

The invention claimed is:

1. A method of providing data communication between a first device and a downstream device, the method comprising:

establishing a downstream communication link between a second device and the downstream device using a USB 3.x communication mode via a first set of USB communication lanes of the second device;

after establishing the downstream communication link, establishing a first communication link between the first device and the second device using a USB-C Alternate Mode (Alt-mode) via a second set of USB communication lanes of the second device, wherein the second set of USB communication lanes includes at least some USB communication lanes of the first set of USB communication lanes; and in response to establishing the first communication link, changing the downstream communication link to a legacy USB communication mode utilizing a set of legacy communication lanes of the second device.

2. The method of claim 1, wherein the legacy USB communication mode is a USB 2.x communication mode.

3. The method of claim 1, wherein the legacy USB communication mode is a USB 1.x communication mode.

4. The method of claim 1, wherein the USB-C Alt-mode is a DisplayPort (DP) communication.

5. The method of claim 1, wherein the USB-C Alt-mode is a thunderbolt 3 communication.

6. The method of claim 1, wherein the USB-C Alt-mode is an HDMI communication.

7. The method of claim 1, wherein the second device includes a USB component for establishing the downstream communication link, and wherein changing the downstream communication link includes changing the downstream communication link to the legacy USB communication mode without resetting the USB component.

8. The method of claim 7, wherein the USB component of the second device is a downstream USB hub of the second device.

9. The method of claim 1, wherein the first device is a host device and the second device is a display device, wherein the first device communicates with the display device via the first communication link in order to display content on the display device, and wherein the display device facilitates a connection between the first device and the downstream device via the downstream communication link.

10. A method of providing data communication between a first device and a downstream device, the method comprising:

at a second device, wherein the second device has a USB component that includes a USB-C port and one or more additional USB-type interfaces for communicating via a set of USB communication lanes and a legacy USB communication lane:

establishing a downstream communication link between the second device and the downstream device using a USB 3.x communication mode, wherein the downstream communication link is made with the one or more additional USB-type interfaces and wherein the USB 3.x communication mode utilizes at least 1 of the set of USB communication lanes;

after establishing the downstream communication link, establishing a first communication link between the first device and the second device using a USB-C Alternate Mode (Alt-mode), wherein the first communication link is made with the USB-C port and wherein the USB-C Alt-mode utilizes all of the set of USB communication lanes; and in response to establishing the first communication link, changing the downstream communication link to a legacy USB communication mode that utilizes the legacy USB communication lane.

11. The method of claim 10, wherein the set of USB communication lanes includes 4 USB communication lanes.

12. The method of claim 10, wherein the legacy USB communication lane is a USB 2.x communication lane.

13. The method of claim 10, wherein the legacy USB communication lane is a USB 1.x communication lane.

14. The method of claim 10, wherein the USB-C Alt-mode is a DisplayPort (DP) communication.

15. The method of claim 10, wherein the USB-C Alt-mode is a thunderbolt 3 communication.

16. The method of claim 10, wherein the USB-C Alt-mode is an HDMI communication.

17. The method of claim 10, wherein the first device is a host device and the second device is a display device, wherein the first device communicates with the display device via the first communication link in order to display content on the display device, and wherein the display device facilitates a connection between the first device and the downstream device via the downstream communication link.

18. A secondary device, comprising:
a universal serial bus (USB) type-C (USB-C) port;
a USB hub having a plurality of ports;
a DisplayPort (DP) processor;
a multiplexer in electrical communication with the USB-C port, wherein the multiplexer is configured to switch a set of data connections between the USB hub and the DP processor, wherein the set of data connections includes a set of USB communication lanes and at least one legacy communication lane;
a microcontroller in data communication with the multiplexer; and
a storage device electrically coupled to the microcontroller having instructions stored thereon that instruct the microcontroller to perform instructions, the instructions including:
establishing a downstream communication link between the secondary device and a downstream device using a USB 3.x communication mode via a first subset of USB communication lanes of the set of USB communication lanes;
after establishing the downstream communication link, detecting a first communication link established between a first device and the secondary device using a USB-C Alternate Mode (Alt-mode) via a second subset of USB communication lanes of the set of USB communication lanes, wherein the second subset of USB communication lanes includes at least some USB communication lanes of the first subset of USB communication lanes; and
in response to detecting the first communication link, changing the downstream communication link to a legacy USB communication mode utilizing the at least one legacy communication lane of the set of data connections.

19. The device of claim 18, wherein the legacy USB communication mode is a USB 2.x communication mode.

20. The device of claim 18, wherein the legacy USB communication mode is a USB 1.x communication mode.

* * * * *